United States Patent
Tambi et al.

(10) Patent No.: US 12,314,309 B2
(45) Date of Patent: May 27, 2025

(54) ZERO-SHOT ENTITY-AWARE NEAREST NEIGHBORS RETRIEVAL

(71) Applicant: ADOBE INC., San Jose, CA (US)

(72) Inventors: Ritiz Tambi, San Francisco, CA (US); Ajinkya Gorakhnath Kale, San Jose, CA (US)

(73) Assignee: ADOBE INC., San Jose, CA (US)

( * ) Notice: Subject to any disclaimer, the term of this patent is extended or adjusted under 35 U.S.C. 154(b) by 301 days.

(21) Appl. No.: 17/934,690

(22) Filed: Sep. 23, 2022

(65) Prior Publication Data
US 2024/0104131 A1    Mar. 28, 2024

(51) Int. Cl.
| | |
|---|---|
| G06F 16/532 | (2019.01) |
| G06F 16/242 | (2019.01) |
| G06F 40/284 | (2020.01) |
| G06F 40/289 | (2020.01) |
| G06F 40/30 | (2020.01) |
| G06F 40/40 | (2020.01) |

(52) U.S. Cl.
CPC .......... *G06F 16/532* (2019.01); *G06F 16/242* (2019.01); *G06F 40/284* (2020.01); *G06F 40/289* (2020.01); *G06F 40/30* (2020.01); *G06F 40/40* (2020.01)

(58) Field of Classification Search
CPC .... G06F 16/532; G06F 16/242; G06F 40/284; G06F 40/289; G06F 40/30; G06F 40/40
USPC .......................................................... 704/9
See application file for complete search history.

(56) References Cited

U.S. PATENT DOCUMENTS

| | | | | |
|---|---|---|---|---|
| 8,566,303 | B2 * | 10/2013 | Jin | G06F 16/90335 707/708 |
| 8,615,524 | B2 * | 12/2013 | Kanigsberg | G06F 16/9535 707/765 |
| 9,015,185 | B2 | 4/2015 | Kanigsberg et al. | |
| 9,342,627 | B2 * | 5/2016 | Jin | G06F 16/90335 |
| 9,576,313 | B2 * | 2/2017 | Kanigsberg | G06F 16/9535 |
| 11,455,332 | B2 * | 9/2022 | Horie | G06V 10/7784 |
| 2011/0219004 | A1 * | 9/2011 | Jin | G06F 16/355 707/E17.09 |
| 2014/0074884 | A1 * | 3/2014 | Jin | G06F 16/90335 707/771 |

(Continued)

FOREIGN PATENT DOCUMENTS

| | | | | |
|---|---|---|---|---|
| CN | 114254752 A | * | 3/2022 | G06F 40/263 |

OTHER PUBLICATIONS

Dall·E: Creating Images from Text, Jan. 5, 2021, found on the internet at: https://openai.com/blog/dall-e/.
Devlin, et al., "BERT: Pre-training of Deep Bidirectional Transformers for Language Understanding", arXiv preprint arXiv:1810.04805v2 [cs.CL] May 24, 2019, 16 pages.

(Continued)

*Primary Examiner* — Edwin S Leland, III
(74) *Attorney, Agent, or Firm* — CHAU & ASSOCIATES, LLC

(57) ABSTRACT

Systems and methods for query processing are described. Embodiments of the present disclosure identify a target phrase in an original query, wherein the target phrase comprises a phrase to be replaced in the original query; replace the target phrase with a mask token to obtain a modified query; generate an alternative query based on the modified query using a masked language model (MLM), wherein the alternative query includes an alternative phrase in place of the target phrase that is consistent with a context of the target phrase; and retrieve a search result based on the alternative query.

20 Claims, 13 Drawing Sheets

(56) References Cited

U.S. PATENT DOCUMENTS

| | | | |
|---|---|---|---|
| 2016/0140130 A1* | 5/2016 | Smirnov | G06F 16/903 |
| | | | 707/740 |
| 2016/0239487 A1* | 8/2016 | Potharaju | G06F 16/24578 |
| 2017/0075996 A1* | 3/2017 | Azimi | G06F 16/951 |
| 2020/0356591 A1* | 11/2020 | Yada | G06F 3/04855 |
| 2021/0073267 A1* | 3/2021 | Chopra | G06N 3/04 |
| 2021/0117466 A1* | 4/2021 | Horie | G06F 16/532 |
| 2021/0165960 A1* | 6/2021 | Eisenschlos | G06F 40/284 |
| 2022/0188661 A1* | 6/2022 | Tappin | G06F 16/248 |
| 2022/0253477 A1* | 8/2022 | Lipka | G06N 20/00 |
| 2022/0327586 A1* | 10/2022 | Malon | G06N 3/045 |
| 2023/0016157 A1* | 1/2023 | Ferreira Moreno | |
| | | | G06F 16/24578 |
| 2023/0099588 A1* | 3/2023 | Zhou | G06F 16/90335 |
| | | | 707/765 |
| 2023/0135659 A1* | 5/2023 | Wu | G06N 3/044 |
| | | | 706/21 |
| 2024/0095275 A1* | 3/2024 | Tambi | G06F 16/538 |
| 2024/0104131 A1* | 3/2024 | Tambi | G06F 40/289 |

OTHER PUBLICATIONS

Liu, et al., "RoBERTa: A Robustly Optimized BERT Pretraining Approach", arXiv preprint arXiv:1907.11692v1 [cs.CL] Jul. 26, 2019, 13 pages.

Bojanowski, et al., "Enriching Word Vectors with Subword Information", Transactions of the association for computational linguistics, 5, pp. 135-146, arXiv preprint: arXiv:1607.04606v2 [cs.CL] Jun. 19, 2017.

Joulin, et al., "Bag of Tricks for Efficient Text Classification", arXiv preprint arXiv:1607.01759v3 [cs.CL] Aug. 9, 2016, 5 pages.

Sennrich, et al., "Neural Machine Translation of Rare Words with Subword Units", arXiv preprint arXiv:1508.07909v5 [cs.CL] Jun. 10, 2016, 11 pages.

Radford, et al, "Language Models are Unsupervised Multitask Learners", OpenAI blog, 1(8), 9, (2019), 24 pages.

Office Action dated Sep. 25, 2023 in related U.S. Appl. No. 17/933,595.

Notice of Allowance dated Jul. 16, 2024 in corresponding U.S. Appl. No. 17/933,595.

\* cited by examiner

ZERO-SHOT ENTITY-AWARE NEAREST NEIGHBORS RETRIEVAL

BACKGROUND

The following relates generally to query processing. Query processing is a field of natural language processing (NLP) that refers to techniques for using computers to interpret or generate natural language. In some cases, NLP tasks involve assigning annotation data such as grammatical information to words or phrases within a natural language expression. Different classes of machine-learning algorithms have been applied to NLP tasks. In some examples, a user inputs a query to a search engine to retrieve a search result such as images related to the query. A machine learning model may provide different search results dependent on the search queries.

However, conventional query processing systems do not automatically modify an original query from a user to obtain alternative queries. Rather, these systems may be limited to the number and variations of images provided by the user. Therefore, there is a need in the art for an improved query processing systems that can augment user queries.

SUMMARY

The present disclosure describes systems and methods for query processing. Embodiments of the present disclosure include a query processing apparatus configured to generate alternative queries based on an original query (i.e., to receive more varied search results). The present disclosure involves creating a modified query by using a mask token in place of a target phrase. A masked language model (MLM) generates candidate alternative phrases based on the modified query by filling the mask token with nearest neighbors, respectively. One or more alternative queries are then selected by comparing candidate phrase embedding to the target phrase embedding. Accordingly, the query processing apparatus provides a search result related to an alternative query such as images depicting the query.

A method, apparatus, and non-transitory computer readable medium for query processing are described. One or more embodiments of the method, apparatus, and non-transitory computer readable medium include identifying a target phrase in an original query, wherein the target phrase comprises a phrase to be replaced in the original query; replacing the target phrase with a mask token to obtain a modified query; generating an alternative query based on the modified query using a masked language model (MLM), wherein the alternative query includes an alternative phrase in place of the target phrase that is consistent with a context of the target phrase; and retrieving a search result based on the alternative query.

A method, apparatus, and non-transitory computer readable medium for query processing are described. One or more embodiments of the method, apparatus, and non-transitory computer readable medium include identifying a target phrase in an original query; replacing the target phrase with a mask token to obtain a modified query; identifying a plurality of candidate alternative phrases using an MLM; encoding the target phrase to obtain a target phrase embedding; encoding the plurality of candidate alternative phrases to obtain a plurality of candidate alternative phrase embeddings; selecting an alternative phrase from the plurality of candidate alternative phrases based on the target phrase embedding and the plurality of candidate alternative phrase embeddings; and generating an alternative query by replacing the target phrase with the alternative phrase.

An apparatus and method for query processing are described. One or more embodiments of the apparatus and method include at least one processor; at least one memory including instructions executable by the processor; an MLM configured to generate a plurality of candidate alternative phrases based on a modified query, wherein the modified query comprises a mask token in place of a target phrase in an original query; an embedding model configured to encode the target phrase to obtain a target phrase embedding and to encode the plurality of candidate alternative phrases to obtain a plurality of candidate alternative phrase embeddings; and a query generation component configured to select an alternative phrase from the plurality of candidate alternative phrases based on the target phrase embedding and the plurality of candidate alternative phrase embeddings and to generate an alternative query by replacing the target phrase with the alternative phrase.

DETAILED DESCRIPTION

Figure 1:
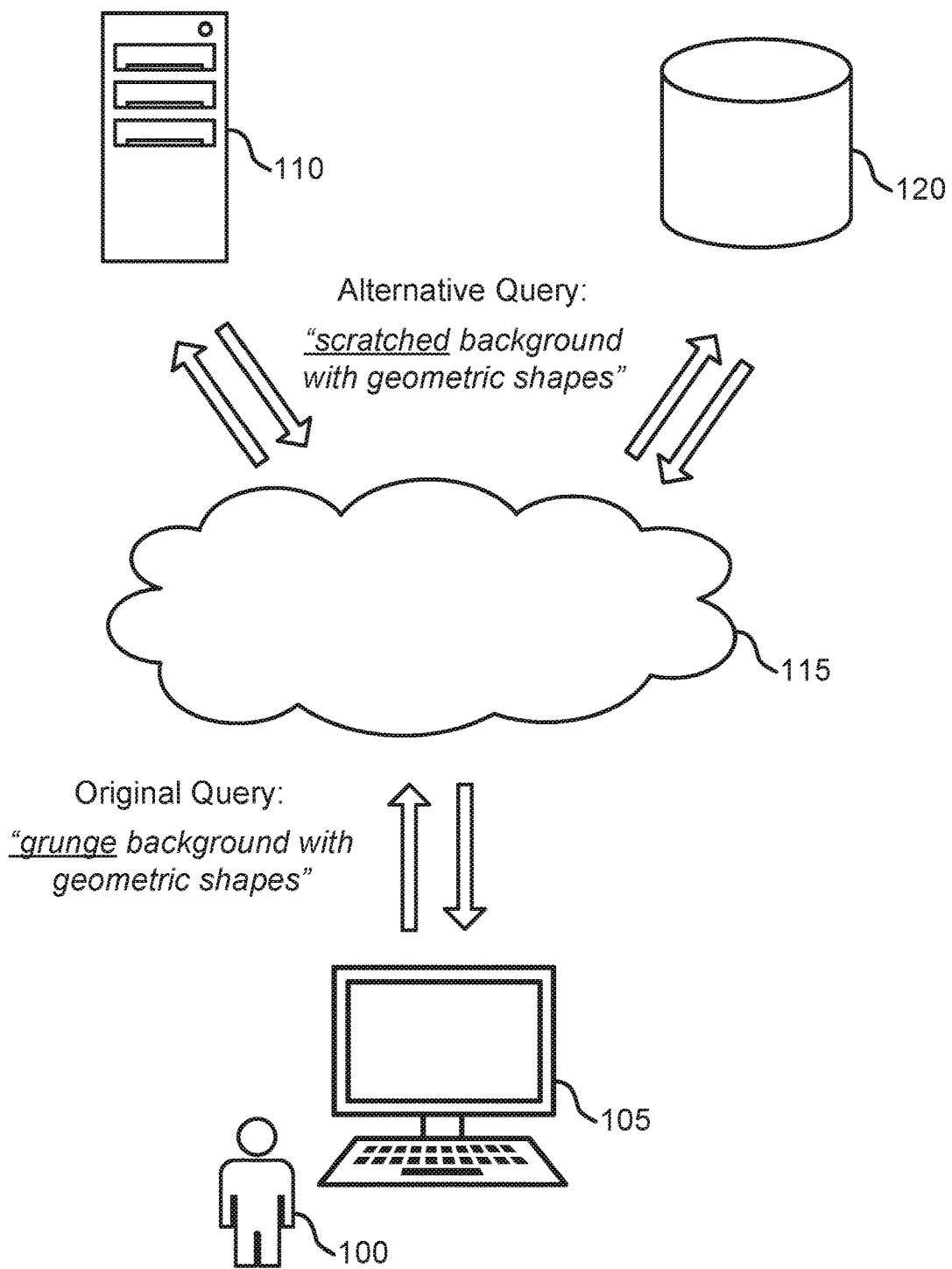
FIG. 1 shows an example of a query processing system according to aspects of the present disclosure.

The present disclosure describes systems and methods for query processing. Embodiments of the present disclosure include a query processing apparatus configured to generate alternative queries based on an original query (i.e., to retrieve more varied search results). The present disclosure involves creating a modified query by using a mask token in place of a target phrase. A masked language model (MLM) generates candidate alternative phrases based on the modified query by filling the mask token with nearest neighbors, respectively. One or more alternative queries are then selected by comparing candidate phrase embedding to the target phrase embedding. Accordingly, the query processing apparatus provides a search result related to an alternative query such as images depicting the query.

Recently, image generation systems are used to generate images based on text such as queries. A multi-modal embedding model can convert text and images into a same embedding space. When a user specifies a prompt, the prompt is converted to a prompt embedding that the generative model conditions on and produces an output image. However, images from these conventional systems are static. That is, the scope of the generated images is limited due to static queries. Accordingly, users receive relatively few variations of images (i.e., less varied search results).

Embodiments of the present disclosure include a query processing apparatus configured to generate one or more alternative queries based on an original query. An alternative query includes an alternative phrase that replaces a target phrase in the original query. A masked language model and a word embedding model are used jointly for contextually and entity-aware nearest neighbors retrieval. In some examples, the query processing apparatus generates an alternative phrase in place of the target phrase that is consistent with a context of the target phrase.

According to some embodiments, the query processing apparatus identifies a target phrase in an original query. The target phrase is a phrase to be replaced in the original query. The query processing apparatus then replaces the target phrase with a mask token to obtain a modified query and generates an alternative query using the masked language model. The query processing apparatus then retrieves a search result (e.g., images related to the alternative query).

According to an embodiment, an embedding model encodes the target phrase to obtain a target phrase embedding. The embedding model encodes a set of candidate alternative phrases to obtain a set of candidate alternative phrase embeddings. The query processing apparatus compares the target phrase embedding to the set of candidate alternative phrase embeddings (e.g., using cosine similarity). The query processing apparatus selects the alternative phrase from the set of candidate alternative phrases based on the comparison.

Embodiments of the present disclosure may be used in the context of query processing. For example, a query processing network based on the present disclosure may take an original query and efficiently generate a variety of alternative queries to expand the search result. An example application, according to some embodiments, is provided with reference to FIG. 5. Details regarding the architecture of an example query processing apparatus are provided with reference to FIGS. 1-4. Example processes for query processing are provided with reference to FIGS. 5-13.

Network Architecture

In FIGS. 1-4, an apparatus and method for query processing are described. One or more aspects of the apparatus and method include at least one processor; at least one memory including instructions executable by the processor; an MLM configured to generate a plurality of candidate alternative phrases based on a modified query, wherein the modified query comprises a mask token in place of a target phrase in an original query; an embedding model configured to encode the target phrase to obtain a target phrase embedding and to encode the plurality of candidate alternative phrases to obtain a plurality of candidate alternative phrase embeddings; and a query generation component configured to select an alternative phrase from the plurality of candidate alternative phrases based on the target phrase embedding and the plurality of candidate alternative phrase embeddings and to generate an alternative query by replacing the target phrase with the alternative phrase.

Some examples of the apparatus and method further include a target phrase identification component configured to identify the target phrase in the original query, wherein the target phrase comprises a phrase to be replaced in the original query. Some examples of the apparatus and method further include a tokenizer configured to generate a token corresponding to each of a plurality of phrases in the original query.

Some examples of the apparatus and method further include a token masking component configured to replace the target phrase in the original query with the mask token to obtain the modified query. Some examples of the apparatus and method further include a search interface configured to retrieve a search result based on the alternative query. In some examples, the MLM includes a transformer model comprising a plurality of attention heads and a plurality of hidden layers.

FIG. 1 shows an example of a query processing system according to aspects of the present disclosure. The example shown includes user 100, user device 105, query processing apparatus 110, cloud 115, and database 120. Query processing apparatus 110 is an example of, or includes aspects of, the corresponding element described with reference to FIG. 2.

As an example shown in FIG. 1, user 100 uploads an original query, e.g., via user device 105 and cloud 115. The original query states "grunge background with geometric shapes". The original query is transmitted to query processing apparatus 110, e.g., via cloud 115. Query processing apparatus 110 identifies a target phrase in an original query. The target phrase is a phrase to be replaced in the original query. In this example, the target phrase is "grunge".

Query processing apparatus 110 replaces the target phrase with a mask token to obtain a modified query and generates an alternative query based on the modified query using a masked language model, where the alternative query includes an alternative phrase in place of the target phrase that is consistent with a context of the target phrase. For example, the alternative phrase is "scratched background with geometric shapes". Query processing apparatus 110 retrieves a search result (e.g., images related to the alternative phrase) from database 120. The alternative query and the search result is returned to user 100 via cloud 115 and user device 105.

User device 105 may be a personal computer, laptop computer, mainframe computer, palmtop computer, personal assistant, mobile device, or any other suitable processing apparatus. In some examples, user device 105 includes software that incorporates a query processing application. In some examples, the query processing application on user device 105 may include functions of query processing apparatus 110. In some examples, user device 105 includes a user interface that displays one or more alternative queries to user 100. The user interface receives the original query from user 100 and receives a user input indicating a target phrase (e.g., "grunge") of the original query.

A user interface may enable user 100 to interact with user device 105. In some embodiments, the user interface may include an audio device, such as an external speaker system, an external display device such as a display screen, or an input device (e.g., remote control device interfaced with the user interface directly or through an input/output (I/O) controller module). In some cases, a user interface may be a graphical user interface (GUI). In some examples, a user interface may be represented in code which is sent to the user device and rendered locally by a browser.

Query processing apparatus 110 includes a computer implemented network comprising a masked language model, an embedding model, a query generation component, a target phrase identification component, a tokenizer, a token masking component, and a search interface.

Query processing apparatus 110 may also include a processor unit, a memory unit, and an I/O module. Additionally, query processing apparatus 110 can communicate with database 120 via cloud 115. In some cases, the architecture of the query processing network is also referred to as a network or a network model. Further detail regarding the architecture of query processing apparatus 110 is provided with reference to FIGS. 2-4. Further detail regarding the operation of query processing apparatus 110 is provided with reference to FIGS. 5-13.

In some cases, query processing apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

Database 120 is an organized collection of data (e.g., candidate images). Query processing apparatus 110 may retrieve a search result including one or more images from database 120. For example, database 120 stores data such as candidate images in a specified format known as a schema. Database 120 may be structured as a single database, a distributed database, multiple distributed databases, or an emergency backup database. In some cases, a database controller may manage data storage and processing in database 120. In some cases, a user interacts with database controller. In other cases, database controller may operate automatically without user interaction.

Figure 2:
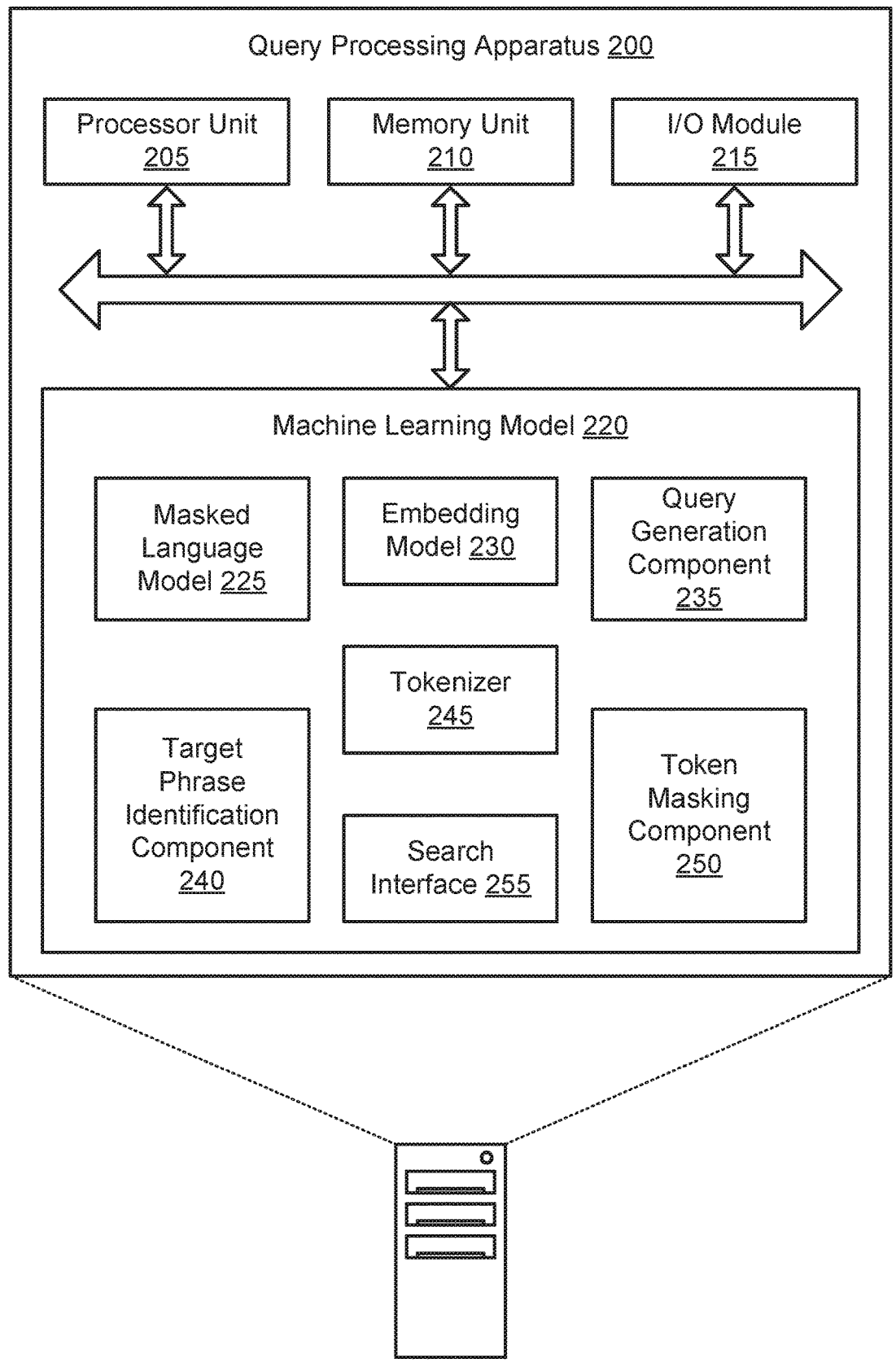
FIG. 2 shows an example of a query processing apparatus according to aspects of the present disclosure.

FIG. 2 shows an example of a query processing apparatus according to aspects of the present disclosure. In one embodiment, query processing apparatus 200 includes processor unit 205, memory unit 210, I/O module 215, and machine learning model 220. Machine learning model 220 includes masked language model 225, embedding model 230, query generation component 235, target phrase identification component 240, tokenizer 245, token masking component 250, and search interface 255. Query processing apparatus 200 is an example of, or includes aspects of, the corresponding element described with reference to FIG. 1.

Processor unit 205 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 205 is configured to operate a memory array using a memory controller. In other cases, a memory controller is integrated into the processor. In some cases, processor unit 205 is configured to execute computer-readable instructions stored in a memory to perform various functions. In some embodiments, processor unit 205 includes special purpose components for modem processing, baseband processing, digital signal processing, or transmission processing.

Examples of memory unit 210 include random access memory (RAM), read-only memory (ROM), or a hard disk. Examples of memory unit 210 include solid state memory and a hard disk drive. In some examples, memory unit 210 is used to store computer-readable, computer-executable software including instructions that, when executed, cause a processor to perform various functions described herein. In some cases, memory unit 210 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within memory unit 210 store information in the form of a logical state.

I/O module 215 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an I/O controller.

In some examples, I/O module 215 includes a user interface. A user interface may enable a user to interact with a device. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a communication interface operates at the boundary between communicating entities and the channel and may also record and process communications. A communication interface is provided herein to enable a processing system coupled to a transceiver (e.g., a transmitter and/or a receiver). In some examples, the transceiver is configured to transmit (or send) and receive signals for a communications device via an antenna.

According to some embodiments, machine learning model 220 identifies a set of candidate alternative phrases based on the filtered set of replacement tokens. In some examples, machine learning model 220 compares the target phrase embedding to the set of candidate alternative phrase embeddings. Machine learning model 220 is an example of, or includes aspects of, the corresponding element described with reference to FIGS. 9 and 10.

According to some embodiments of the present disclosure, query processing apparatus 200 includes a computer implemented artificial neural network (ANN). An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

During the training process, the parameters and weights of machine learning model 220 are adjusted to increase the accuracy of the result (i.e., by attempting to minimize a loss function which corresponds to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

According to some embodiments, masked language model 225 generates an alternative query based on the modified query using a masked language model (MLM), where the alternative query includes an alternative phrase in place of the target phrase that is consistent with a context of the target phrase. In some examples, masked language model 225 generates a set of replacement tokens based on the modified query.

In some examples, masked language model 225 generates an additional alternative phrase based on the modified query. Masked language model 225 generates an additional alternative query that includes the additional alternative phrase in place of the target phrase. In some examples, masked language model 225 generates an additional alternative query based on the additional target phrase, where the additional alternative query includes an additional alternative phrase in place of the additional target phrase.

According to some embodiments, masked language model 225 identifies a set of candidate alternative phrases. In some examples, masked language model 225 generates a set of replacement tokens based on the modified query.

According to some embodiments, masked language model 225 is configured to generate a set of candidate alternative phrases based on a modified query, where the modified query includes a mask token in place of a target phrase in an original query. In some examples, the MLM includes a transformer model including a set of attention heads and a set of hidden layers. Masked language model 225 is an example of, or includes aspects of, the corresponding element described with reference to FIGS. 3 and 4.

The present disclosure includes a zero-shot method to retrieve similar tokens. Masked language model 225, such as transformer-based language model, can learn linguistic structure within their layers even when trained exclusively on a self-supervised masked language modeling task.

According to some embodiments, embedding model 230 encodes the target phrase to obtain a target phrase embedding. In some examples, embedding model 230 encodes a set of candidate alternative phrases to obtain a set of candidate alternative phrase embeddings. In some examples, embedding model 230 encodes the alternative query to obtain an alternative query embedding. Embedding model 230 compares the alternative query embedding to one or more image embeddings. Embedding model 230 is an example of, or includes aspects of, the corresponding element described with reference to FIG. 3.

A word embedding is a learned representation for text where words that have the same meaning have a similar representation. GloVe and Word2vec are examples of systems for obtaining a vector representation of words. GloVe is an unsupervised algorithm for training a network using on aggregated global word-word co-occurrence statistics from a corpus. Similarly, a Word2vec model may include a shallow neural network trained to reconstruct the linguistic context of words. GloVe and Word2vec models may take a large corpus of text and produces a vector space as output. In some cases, the vector space may have a large number of dimensions. Each word in the corpus is assigned a vector in the space. Word vectors are positioned in the vector space in a manner such that similar words are located nearby in the vector space. In some cases, an embedding space may include syntactic or context information in additional to semantic information for individual words.

In some examples, masked language model 225 and embedding model 230 are trained on Adobe® Stock captions. In some examples, 70 million Adobe® Stock captions are used during training.

According to some embodiments, query generation component 235 selects the alternative phrase from the set of candidate alternative phrases based on the comparison. Query generation component 235 selects an alternative phrase from the set of candidate alternative phrases based on the target phrase embedding and the set of candidate alternative phrase embeddings. In some examples, query generation component 235 generates an alternative query by replacing the target phrase with the alternative phrase. Query generation component 235 is an example of, or includes aspects of, the corresponding element described with reference to FIG. 3.

According to some embodiments, target phrase identification component 240 identifies a target phrase in an original query, where the target phrase includes a phrase to be replaced in the original query. In some examples, target phrase identification component 240 identifies an additional target phrase in the original query.

According to some embodiments, tokenizer 245 tokenizes the original query to obtain a set of tokens. Tokenizer 245 is configured to generate a token corresponding to each of a plurality of phrases in the original query. Tokenizer 245 is an example of, or includes aspects of, the corresponding element described with reference to FIG. 4.

According to some embodiments, token masking component 250 replaces the target phrase in the original query with a mask token to obtain a modified query. In some examples, token masking component 250 replaces a target token corresponding to the target phrase with the mask token to obtain the modified query, where the modified query includes a tokenized query. Token masking component 250 is an example of, or includes aspects of, the corresponding element described with reference to FIG. 3.

According to some embodiments, search interface 255 retrieves a search result based on the alternative query. In some examples, search interface 255 receives the original query from a user. In some examples, search interface 255 receives a user input indicating the target phrase, where the target phrase is identified based on the user input. In some examples, search interface 255 retrieves an additional search result based on the additional alternative query. In some examples, search interface 255 selects the one or more image embeddings as the search result based on the comparison.

According to some embodiments, search interface 255 provides an image based on the alternative query via searching a database of candidate images. In some examples, an image generation model may be used to generate or synthesize a set of images based on the alternative query. Search interface 255 provides the set of images. Search interface 255 is an example of, or includes aspects of, the corresponding element described with reference to FIGS. 6 and 7.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

Figure 3:
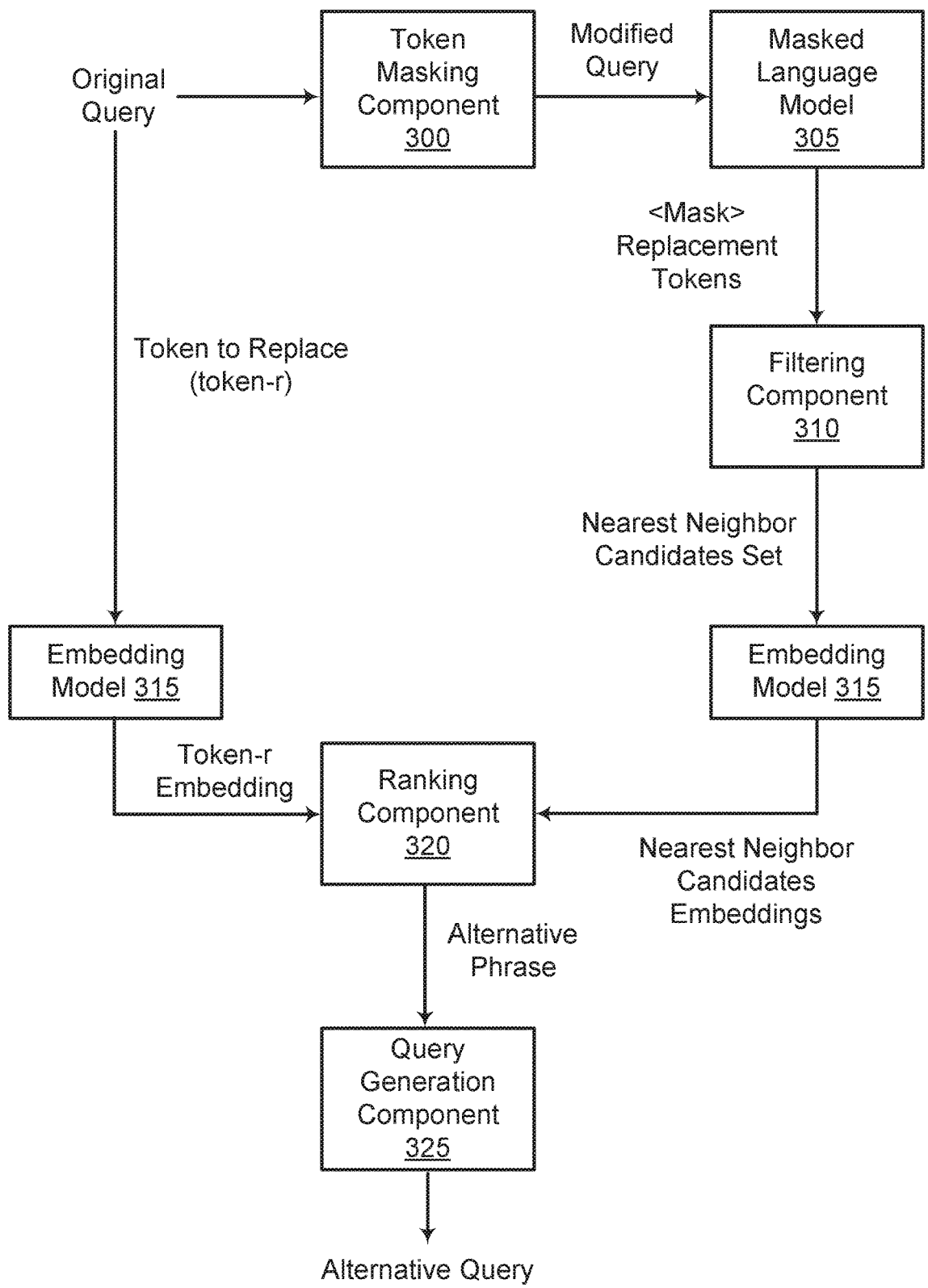
FIG. 3 shows an example of a machine learning model according to aspects of the present disclosure.

FIG. 3 shows an example of a machine learning model according to aspects of the present disclosure. The example shown includes token masking component 300, masked language model 305, filtering component 310, embedding model 315, ranking component 320, and query generation component 325.

Deep contextual language models with multi-headed attention can learn and identify linguistic structure without explicit supervision even when trained on a masked language modeling task. According to an embodiment, masked language model 305 is capable of entity awareness about the tokens provided to it and the tokens it generates. In some cases, masked language model 305 is trained with a fill in the mask or a fill in the blank objective. Training text has a certain percentage of words masked for sentences. When an input with a mask to be filled is provided to masked language model 305, it attends over the non-mask tokens of the input, which act as context and suggest what word can fill in the mask. These suggested words are contextually aware.

According to some embodiments, the machine learning model takes an input sentence (and the token to replace) as input to retrieve nearest neighbors. In some cases, token-r is used for simplicity. A token masking component inserts <mask> in place of the token, masked language model 305 is run on the modified input, and restricts the model's output for <mask> replacements to 5000 tokens. Suggestions that form the nearest neighbor candidate set may not be directly related to the token-r. The machine learning model then filters out the irrelevant tokens using semantic similarity (e.g., cosine similarity) with token-r. In some examples, the process and resources of training embedding model 315 may be substantially similar as the process and resources for training masked language model 305.

As an example shown in FIG. 3, an original query is input to token masking component 300, and token masking component 300 outputs a modified query accordingly. Token masking component 300 replaces the target phrase in the original query with a mask token to obtain a modified query. In some examples, token masking component 300 replaces a target token corresponding to the target phrase with the mask token to obtain the modified query. The modified query includes a tokenized query. Token masking component 300 is an example of, or includes aspects of, the corresponding element described with reference to FIG. 2.

According to an embodiment, the modified query with a <mask> is input to masked language model 305 which outputs <mask> replacement tokens accordingly. An input with a <mask> to be filled is input to masked language model 305. Masked language model 305 attends over the non-mask tokens of the input, which act as context and suggest what word can fill the <mask>. In open domain, masked language model 305 includes bi-directional encoder representations from transformers (BERT) or robustly optimized variation of BERT (i.e., RoBERTa model) which is trained over a large amount of text data across various Corporas. In niche or restricted domain, masked language model 305 may be fine-tuned or masked language model 305 is trained from scratch on text data from the niche or restricted domain. The text data is used for training word embeddings. Embodiments of the present disclosure are not dependent on any annotated entity data or presets. For open domain, open-source models or embeddings based on GloVe, fastText, word2vec or any other such model may work. For closed domain, a training component (FIG. 2) trains these embeddings on domain data. Masked language model 305 is an example of, or includes aspects of, the corresponding element described with reference to FIGS. 2 and 4.

According to an embodiment, filtering component 310 filters the set of replacement tokens to obtain a filtered set of replacement tokens (e.g., nearest neighbor candidates set). Irrelevant tokens are filtered out using semantic similarity (e.g., cosine similarity) with token-r.

In some examples, an original query is "abstract background with tulips on a field". A user identifies a target phrase in the original query. Token masking component 300 replaces the target phrase with a mask token. The mask token represents a target phrase to be replaced in the original query. Using MLM and semantic search algorithm with 20 neighbors, 20 tokens and corresponding alternative queries (i.e., updated prompts) are generated. For example, a user chooses "tulips" as the target phrase (and mask token). Masked language model 305 generates the replacement tokens (and corresponding alternative phrases). The alternative phrases include tulips, daffodil, freesia, hyacinth, gerbera, bouquet, alstroemeria, chrysanthemum, carnation, pansy, snowdrop, hydrangea, jonquil, spring, daisy, mimosa, primula, dahlia, gypsophila, and buttercup. Filtering component 310 generates a filtered set of replacement tokens (i.e., nearest neighbor candidates set) which is then input to embedding model 315. Embedding model 315 outputs nearest neighbor candidates embeddings. Embedding model 315 is an example of, or includes aspects of, the corresponding element described with reference to FIG. 2.

According to an embodiment, token to replace (token-r) is input to embedding model 315 to generate token-r embedding. Embedding model 315 encodes a set of candidate alternative phrases to obtain a set of candidate alternative phrase embeddings. The token-r embedding and the candidate alternative phrase embeddings (i.e., nearest neighbor candidates embeddings) are input to ranking component 320. Ranking component 320 computes a similarity value between the target phrase embedding and each of the set of candidate alternative phrase embeddings. The comparison is based on the similarity value. Ranking component 320 selects the alternative phrase from the set of candidate alternative phrases based on the comparison.

According to an embodiment, the alternative phrase is input to query generation component 325. Query generation component 325 generates an alternative query by replacing the target phrase of the original query with the alternative phrase. That is, the alternative query includes an alternative phrase in place of the target phrase that is consistent with a context of the target phrase. Query generation component 325 is an example of, or includes aspects of, the corresponding element described with reference to FIG. 2.

Figure 4:
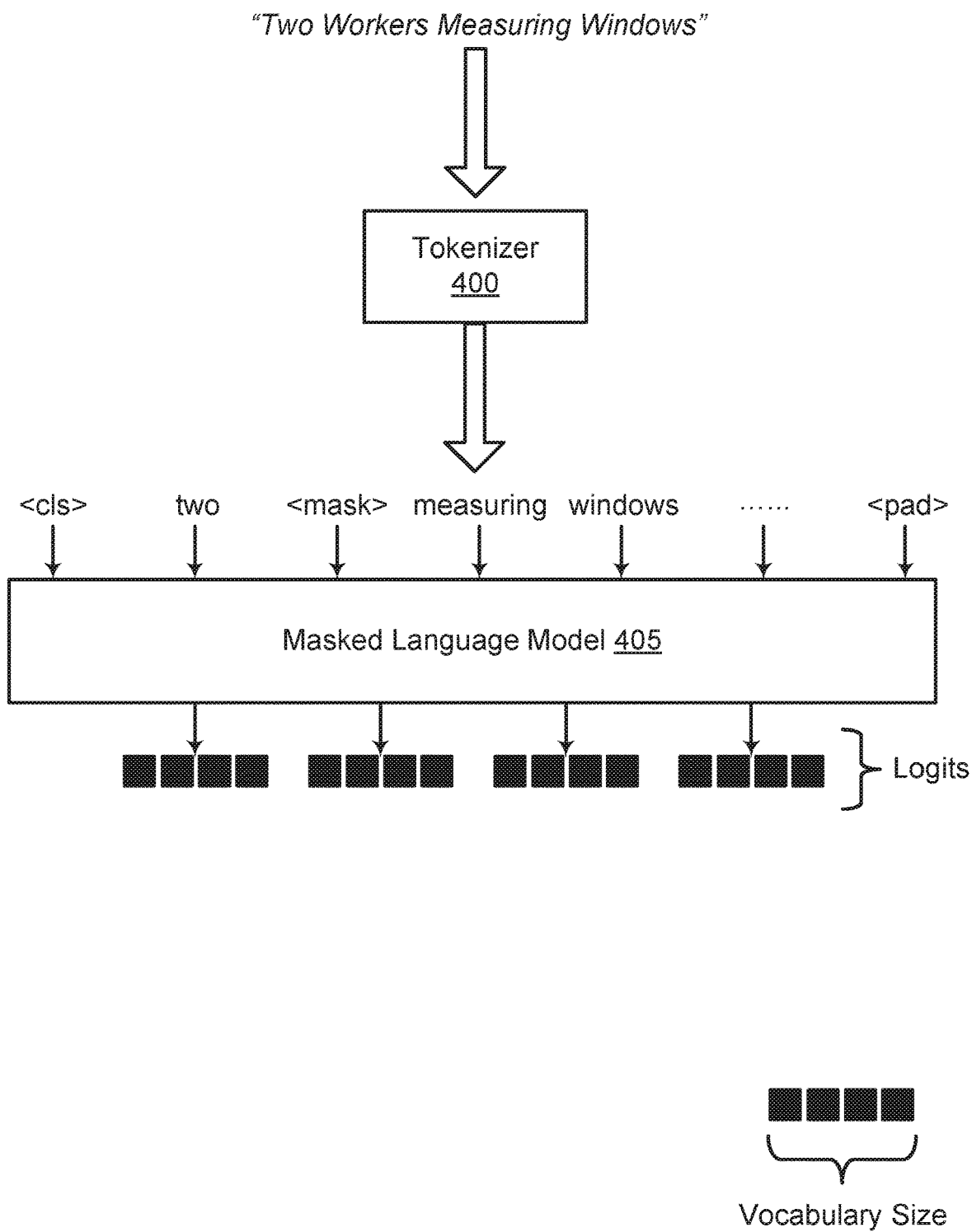
FIG. 4 shows an example of a masked language model according to aspects of the present disclosure.

FIG. 4 shows an example of a masked language model according to aspects of the present disclosure. The example shown includes tokenizer 400 and masked language model 405.

According to an embodiment, masked language model 405 assigns logits scores to the tokens in the model vocabulary. A model vocabulary includes a pre-determined list of words or phrases. Tokens are ranked according to these scores, and the top-rank tokens form the suggestion. The rank number is configurable, and a user can choose whether to see the top 5, 50, 500, 5000 or even more tokens. In some cases, the suggested tokens get less accurate and less contextual lower down the rank order.

According to an embodiment, masked language model 405 includes a BERT architecture or a version of BERT (e.g., RoBERTa model). In some examples, BERT is used as a language representation model, and is configured to pretrain deep bidirectional representations from unlabeled text by jointly conditioning on both left and right context in all layers. As a result, the pre-trained BERT model can be fine-tuned with an additional output layer to create network models for tasks such as question answering and language inference.

In some examples, the BERT model uses a masked language model (i.e., MLM or Masked LM) pre-training objective to alleviate the unidirectionality constraint. The masked language model randomly masks some of the tokens from the input, and the objective is to predict the original vocabulary id of the masked word based only on its context. Unlike left-to-right language model pre-training, the MLM objective enables the representation to fuse the left and the right context, which pretrains a deep bi-directional transformer. In addition to the masked language model, BERT includes a next sentence prediction (NSP) task that jointly pretrains text-pair representations.

According to an embodiment, tokenizer 400 is configured to tokenize the original query to obtain a plurality of tokens. As an example, an original query is "two workers measuring window". Tokenizer 400 is an example of, or includes aspects of, the corresponding element described with reference to FIG. 2. A token masking component replaces a target token corresponding to the target phrase with the mask token to obtain the modified query. The modified query includes a tokenized query. For example, the modified query is "<cls> two <mask> measuring windows . . . <pad>". The modified query is input to masked language model 405 to generate logits. Masked language model 405 is an example of, or includes aspects of, the corresponding element described with reference to FIGS. 2 and 3.

Query Processing

In FIGS. 5-13, a method, apparatus, and non-transitory computer readable medium for query processing are described. One or more aspects of the method, apparatus, and non-transitory computer readable medium include identifying a target phrase in an original query, wherein the target phrase comprises a phrase to be replaced in the original query; replacing the target phrase with a mask token to obtain a modified query; generating an alternative query based on the modified query using a masked language model (MLM), wherein the alternative query includes an alternative phrase in place of the target phrase that is consistent with a context of the target phrase; and retrieving a search result based on the alternative query.

Some examples of the method, apparatus, and non-transitory computer readable medium further include receiving the original query from a user. Some examples further include receiving a user input indicating the target phrase, wherein the target phrase is identified based on the user input.

Some examples of the method, apparatus, and non-transitory computer readable medium further include tokenizing the original query to obtain a plurality of tokens. Some examples further include replacing a target token corresponding to the target phrase with the mask token to obtain the modified query, wherein the modified query comprises a tokenized query.

Some examples of the method, apparatus, and non-transitory computer readable medium further include generating a plurality of replacement tokens based on the modified query. Some examples further include filtering the plurality of replacement tokens to obtain a filtered set of replacement tokens. Some examples further include identifying a plurality of candidate alternative phrases based on the filtered set of replacement tokens.

Some examples of the method, apparatus, and non-transitory computer readable medium further include encoding the target phrase to obtain a target phrase embedding. Some examples further include encoding a plurality of candidate alternative phrases to obtain a plurality of candidate alternative phrase embeddings. Some examples further include comparing the target phrase embedding to the plurality of candidate alternative phrase embeddings. Some examples further include selecting the alternative phrase from the plurality of candidate alternative phrases based on the comparison.

Some examples of the method, apparatus, and non-transitory computer readable medium further include computing a similarity value between the target phrase embedding and each of the plurality of candidate alternative phrase embeddings, wherein the comparison is based on the similarity value.

Some examples of the method, apparatus, and non-transitory computer readable medium further include generating an additional alternative phrase based on the modified query. Some examples further include generating an additional alternative query that includes the additional alternative phrase in place of the target phrase. Some examples further include retrieving an additional search result based on the additional alternative query.

Some examples of the method, apparatus, and non-transitory computer readable medium further include identifying an additional target phrase in the original query. Some examples further include generating an additional alternative query based on the additional target phrase, wherein the additional alternative query includes an additional alternative phrase in place of the additional target phrase. Some examples further include retrieving an additional search result based on the additional alternative query.

Some examples of the method, apparatus, and non-transitory computer readable medium further include encoding the alternative query to obtain an alternative query embedding. Some examples further include comparing the alternative query embedding to one or more image embeddings. Some examples further include selecting the one or more image embeddings as the search result based on the comparison.

A method, apparatus, and non-transitory computer readable medium for query processing are described. One or more aspects of the method, apparatus, and non-transitory computer readable medium include identifying a target phrase in an original query; replacing the target phrase with a mask token to obtain a modified query; identifying a plurality of candidate alternative phrases using an MLM; encoding the target phrase to obtain a target phrase embedding; encoding the plurality of candidate alternative phrases to obtain a plurality of candidate alternative phrase embeddings; selecting an alternative phrase from the plurality of candidate alternative phrases based on the target phrase embedding and the plurality of candidate alternative phrase embeddings; and generating an alternative query by replacing the target phrase with the alternative phrase.

Some examples of the method, apparatus, and non-transitory computer readable medium further include tokenizing the original query to obtain a plurality of tokens. Some examples further include replacing a target token corresponding to the target phrase with the mask token to obtain the modified query, wherein the modified query comprises a tokenized query.

Some examples of the method, apparatus, and non-transitory computer readable medium further include generating a plurality of replacement tokens based on the modified query. Some examples further include filtering the plurality of replacement tokens to obtain a filtered set of replacement tokens. Some examples further include identifying the plurality of candidate alternative phrases based on the filtered set of replacement tokens. Some examples of the method, apparatus, and non-transitory computer readable medium further include generating an image based on the alternative query.

Some examples of the method, apparatus, and non-transitory computer readable medium further include encoding the alternative query to obtain an alternative query embedding. Some examples further include comparing the alternative query embedding to one or more image embeddings. Some examples further include selecting the one or more image embeddings as a search result based on the comparison.

Figure 5:
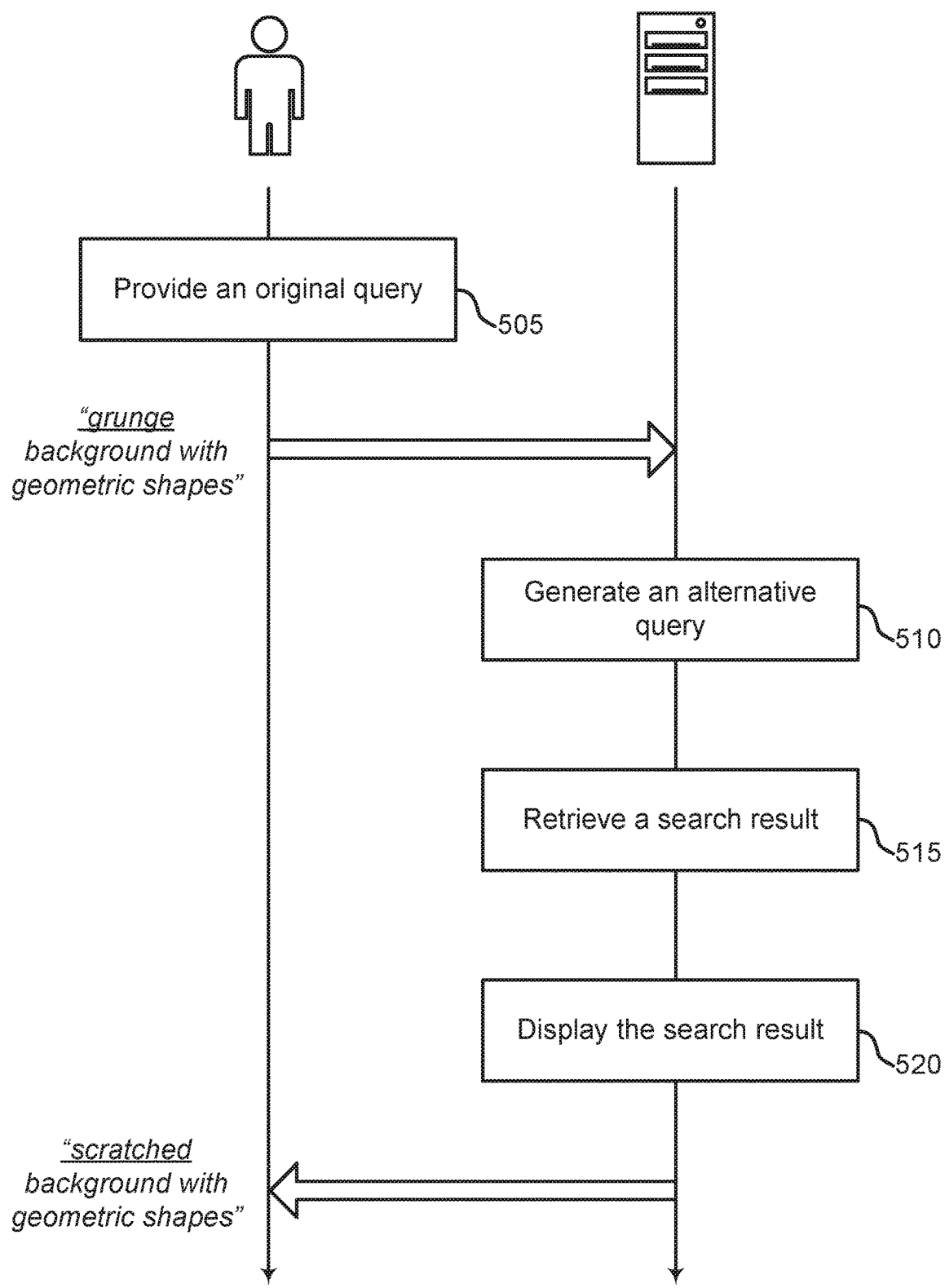
FIG. 5 shows an example of query processing according to aspects of the present disclosure.

FIG. 5 shows an example of query processing according to aspects of the present disclosure. In some examples, these operations are performed by a system including a processor executing a set of codes to control functional elements of an apparatus, such as query processing apparatus 200 as shown in FIG. 2. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 505, the user provides an original query. In some cases, the operations of this step refer to, or may be performed by, a user as described with reference to FIG. 1. In some examples, the user uploads the original query via a query upload element of a user interface. The original query recites "grunge background with geometric shapes." The word "grunge" is underscored to indicate it is a target phrase selected by the user to be replaced.

At operation 510, the system generates an alternative query based on the original query. In some cases, the operations of this step refer to, or may be performed by, a query processing apparatus as described with reference to FIGS. 1 and 2. The query processing apparatus generates a set of candidate alternative phrases and filters the set of candidate alternative phrases to obtain the alternative query. For example, the alternative query is the highest ranked in the set of candidate alternative phrases based on certain metrics (e.g., cosine similarity value). In the above example, the alternative query recites "scratched background with geometric shapes". The query processing apparatus can generate one or more alternative queries based on a threshold value (i.e., the threshold value indicates a number of alternative queries a user wants to see). The phrase "scratched" replaces the original phrase "grunge".

At operation 515, the system retrieves a search result based on the alternative query. In some cases, the operations of this step refer to, or may be performed by, a query processing apparatus as described with reference to FIGS. 1 and 2. The search result may include one or more images that depict content of the alternative query. The search result broadens or diversifies a search result related to the original query. In the above example, the search result includes images related to "scratched background with geometric shapes".

At operation 520, the system displays the search result. In some cases, the operations of this step refer to, or may be performed by, a query processing apparatus as described with reference to FIGS. 1 and 2. In the above example, the target phrase is replaced with the alternative phrase. The query processing apparatus generates an alternative query, "scratched background with geometric shapes". The phrase "scratched" is underscored to indicate it is an alternative phrase in place of the target phrase in the alternative query. The word "scratched" is consistent with a context of the target phrase "grunge".

Figure 6:
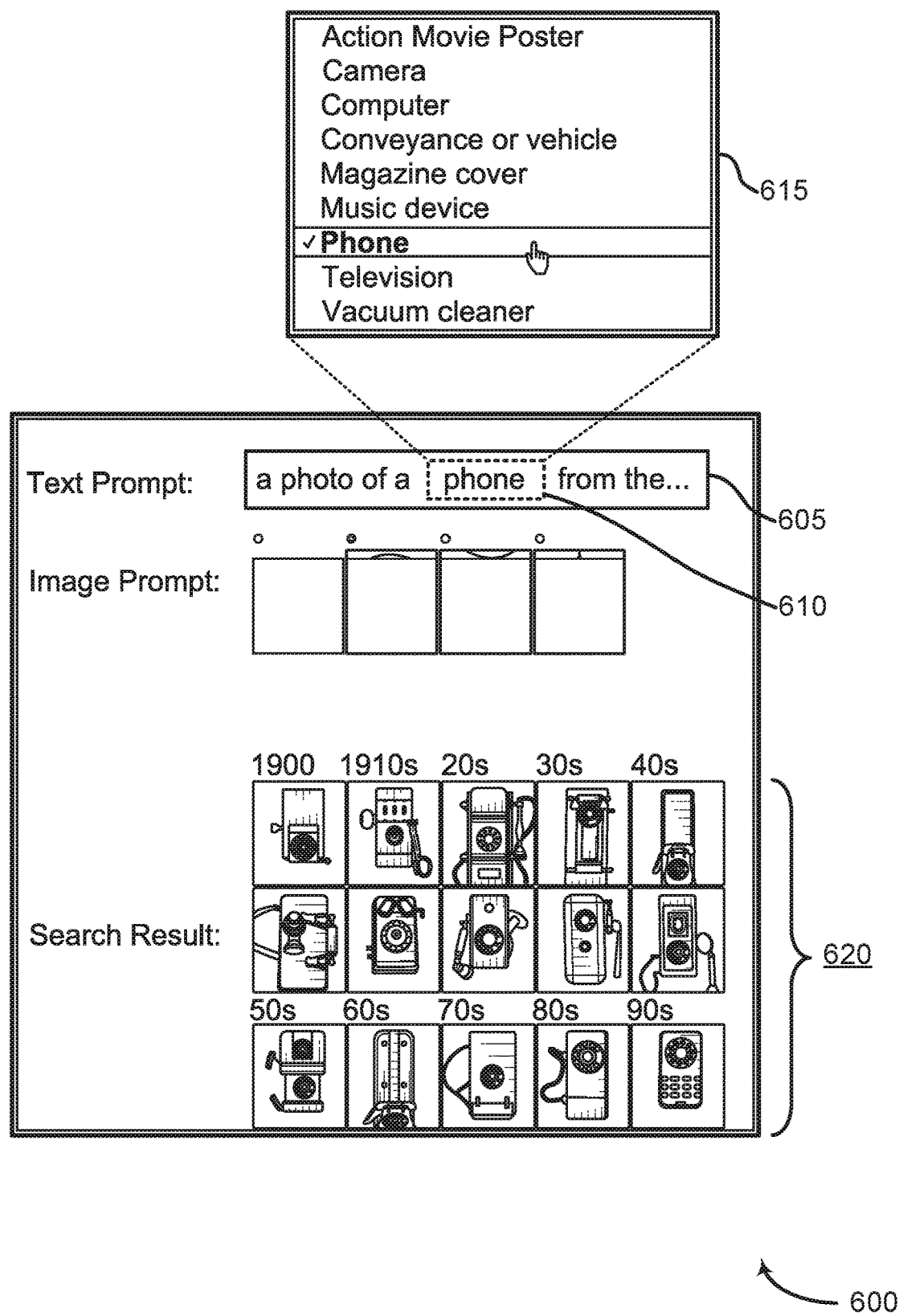
FIG. 6 shows an example of a user interface for prompt expansion according to aspects of the present disclosure.

FIG. 6 shows an example of a user interface for prompt expansion according to aspects of the present disclosure. The example shown includes search interface 600, original query 605, target phrase 610, candidate alternative phrases 615, and search result 620.

In some examples, original query 605, "a photo of a phone from the . . . ", is typed via search interface 600 (e.g., text prompt). Here, "phone" is selected as target phrase 610 to be replaced. Users may be interested in seeing alternative queries of the original text prompt. The machine learning model as shown in FIG. 2 generates a set of candidate alternative phrases 615 such as action movie poster, camera, computer, conveyance or vehicle, magazine cover, music device, phone, television, vacuum cleaner, etc. In an example, "phone" is selected as an alternative phrase from candidate alternative phrases 615. The machine learning model generates an alternative query and provides images related to the alternative query (e.g., search result 620 includes images of phones).

Search interface 600 is an example of, or includes aspects of, the corresponding element described with reference to FIGS. 2 and 7. Original query 605 is an example of, or includes aspects of, the corresponding element described with reference to FIGS. 7, 9, and 10. Target phrase 610 is an example of, or includes aspects of, the corresponding element described with reference to FIGS. 7, 9, and 10. Candidate alternative phrases 615 is an example of, or includes aspects of, the corresponding element described with reference to FIG. 7. Search result 620 is an example of, or includes aspects of, the corresponding element described with reference to FIG. 7.

Figure 7:
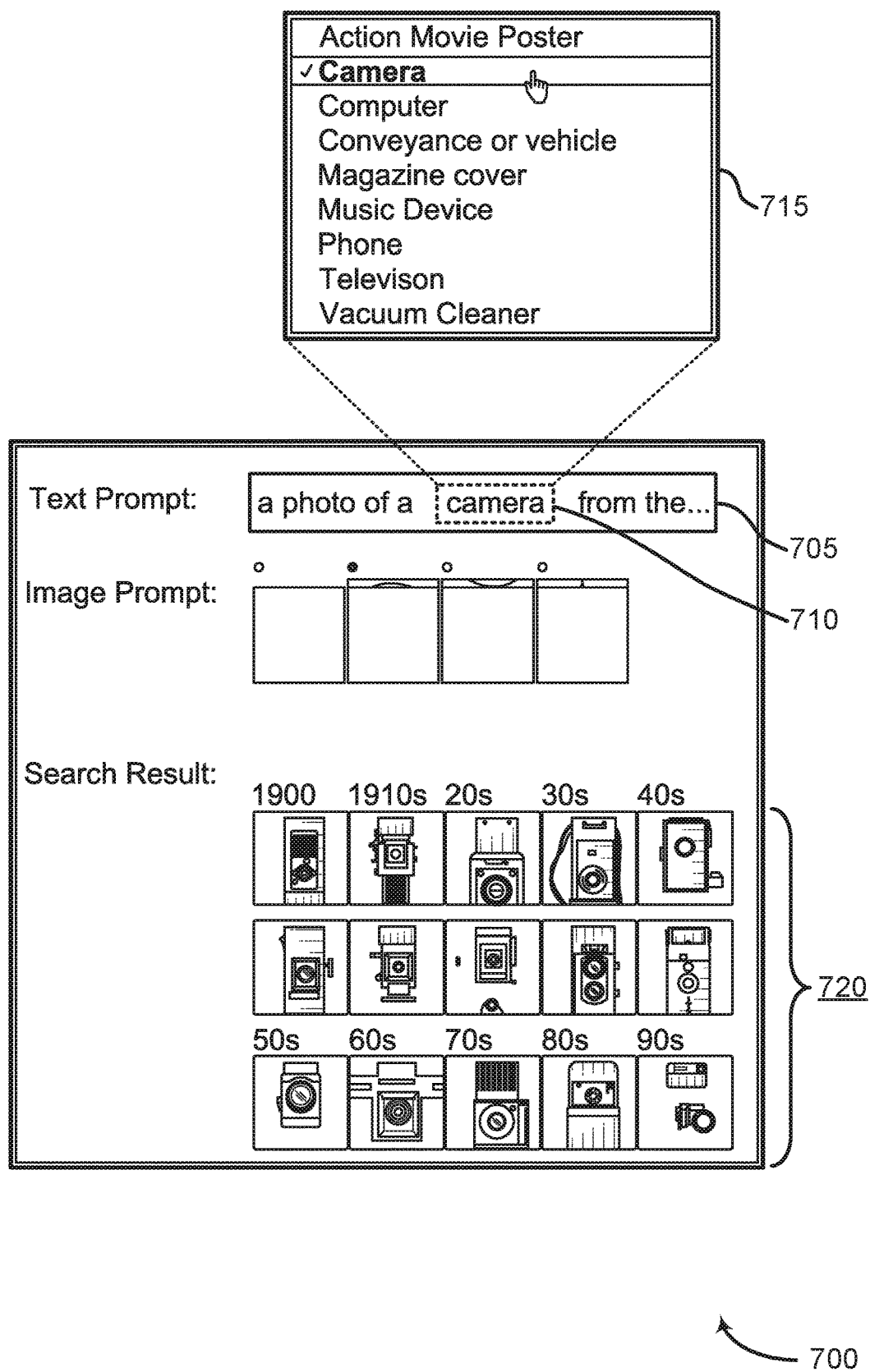
FIG. 7 shows an example of a user interface for prompt expansion according to aspects of the present disclosure.

FIG. 7 shows an example of a user interface according to aspects of the present disclosure. The example shown includes search interface 700, original query 705, target phrase 710, candidate alternative phrases 715, and search result 720.

In some examples, an original query, "a photo of a phone from the . . . ", is typed in a search interface (e.g., text prompt field). The phrase "phone" is selected as a target phrase. The machine learning model as shown in FIG. 2 generates a set of candidate alternative phrases such as action movie poster, camera, computer, conveyance or vehicle, magazine cover, music device, phone, television, vacuum cleaner, etc. The phrase "camera" is selected as an alternative phrase from the set of candidate alternative phrases. The machine learning model generates an alternative query, "a photo of a camera from the . . . ". Search interface 700 shows search result including photos of a camera.

Search interface 700 is an example of, or includes aspects of, the corresponding element described with reference to FIGS. 2 and 6. Original query 705 is an example of, or includes aspects of, the corresponding element described with reference to FIGS. 6, 9, and 10. Target phrase 710 is an example of, or includes aspects of, the corresponding element described with reference to FIGS. 6, 9, and 10. Candidate alternative phrases 715 is an example of, or includes aspects of, the corresponding element described with reference to FIG. 6. Search result 720 is an example of, or includes aspects of, the corresponding element described with reference to FIG. 6.

Figure 8:
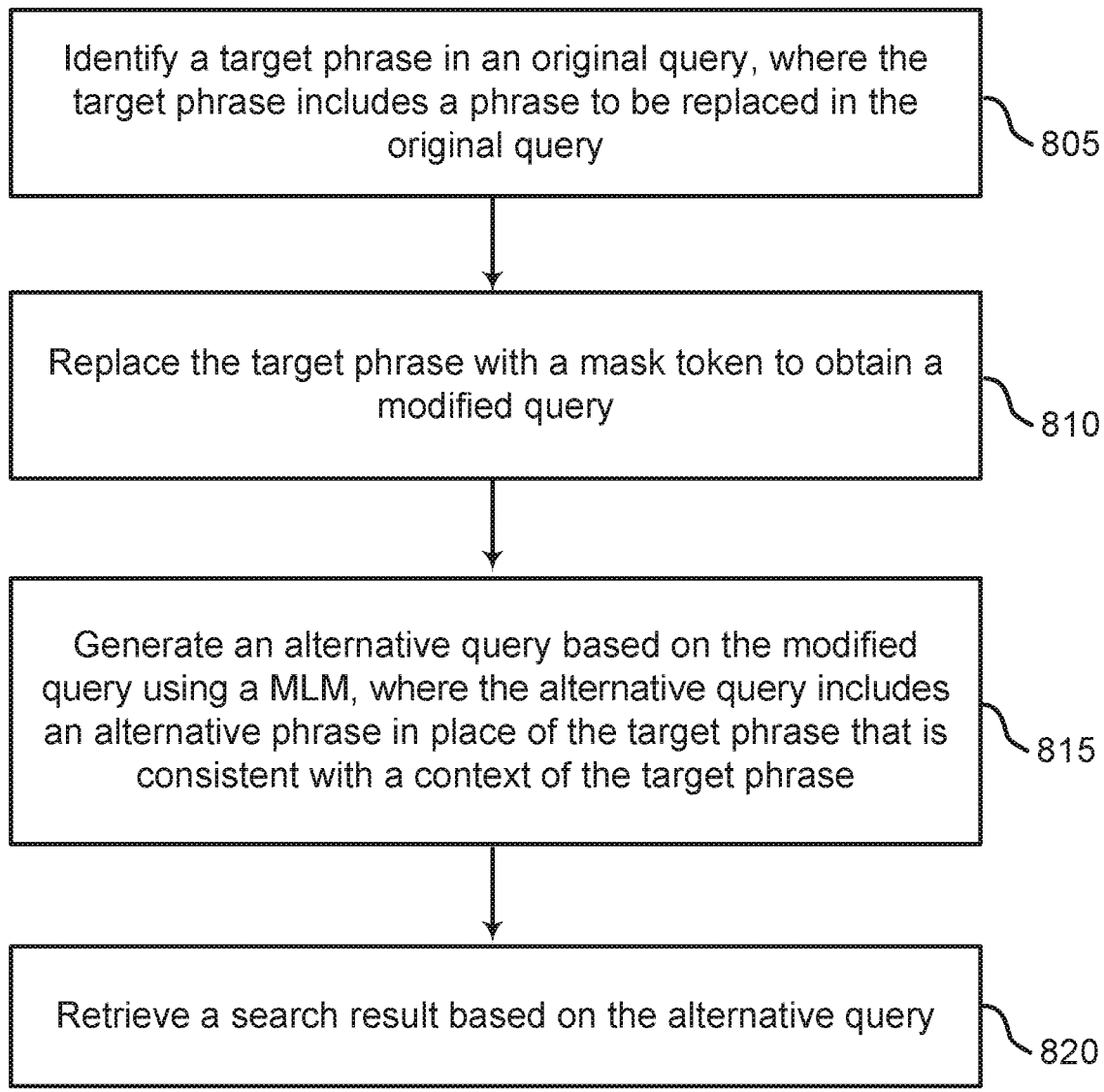
FIG. 8 shows an example of a method for query processing according to aspects of the present disclosure.

FIG. 8 shows an example of a method for query processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system identifies a target phrase in an original query, where the target phrase includes a phrase to be replaced in the original query. In some examples, a target phrase identification component receives an original query. A user input indicates selection of a target phrase. One or more phrases of the original query are selected as a target phrase. As examples shown in FIGS. 6 and 7, an original query is "a photo of a phone from the . . . ". The phrase "phone" is the target phrase. The target phrase "phone" is to be replaced by alternative phrases to obtain alternative queries, respectively. In some cases, the operations of this step refer to, or may be performed by, a target phrase identification component as described with reference to FIG. 2. In some cases, a target phrase identification component selects the target phrase of the original query based on user selection. The target phrase is to be replaced with an alternative phrase.

At operation 810, the system replaces the target phrase with a mask token to obtain a modified query. In some cases, the operations of this step refer to, or may be performed by, a token masking component as described with reference to FIGS. 2 and 3. According to an embodiment, the token masking component replaces the target phrase with a mask token or <mask> to obtain a modified query. The modified query is input to MLM to generate an alternative query. As examples shown in FIGS. 6 and 7, the target phrase "phone" is replaced by a mask token denoted as <mask>. Accordingly, a modified query is "a photo of a <mask> from the . . . ".

At operation 815, the system generates an alternative query based on the modified query using an MLM, where the alternative query includes an alternative phrase in place of the target phrase that is consistent with a context of the target phrase. In some cases, the operations of this step refer to, or may be performed by, a masked language model as described with reference to FIGS. 2-4. According to some embodiments, the masked language model takes a modified query as input. As examples shown in FIGS. 6 and 7, the MLM takes the modified query "a photo of a <mask> from the . . . " as input. The masked language model generates a set of replacement tokens (and corresponding candidate alternative phrases) based on the modified query. An embedding model encodes the target phrase to obtain a target phrase embedding. The embedding model encodes a set of candidate alternative phrases to obtain a set of candidate alternative phrase embeddings. A ranking component compares the target phrase embedding to the set of candidate alternative phrase embeddings. The ranking component selects the alternative phrase from the set of candidate alternative phrases based on the comparison. The ranking component computes a similarity value between the target phrase embedding and each of the candidate alternative phrase embeddings and make the rankings based on the similarity value. As examples shown in FIGS. 6 and 7, a set of top-ranked candidate alternative phrases include action movie poster, camera, computer, conveyance or vehicle, magazine cover, music device, phone, television, vacuum cleaner, etc. As an example shown in FIG. 7, an alternative phrase "camera" is selected. Accordingly, the alternative query is "a photo of a camera from . . . ".

At operation 820, the system retrieves a search result based on the alternative query. In some cases, the operations of this step refer to, or may be performed by, a search interface as described with reference to FIGS. 2, 6, and 7. As an example shown in FIG. 7, the search interface shows an alternative phrase "camera" to replace the target phrase "phone" in the text prompt. The search interface then shows search result including images of a camera.

Figure 9:
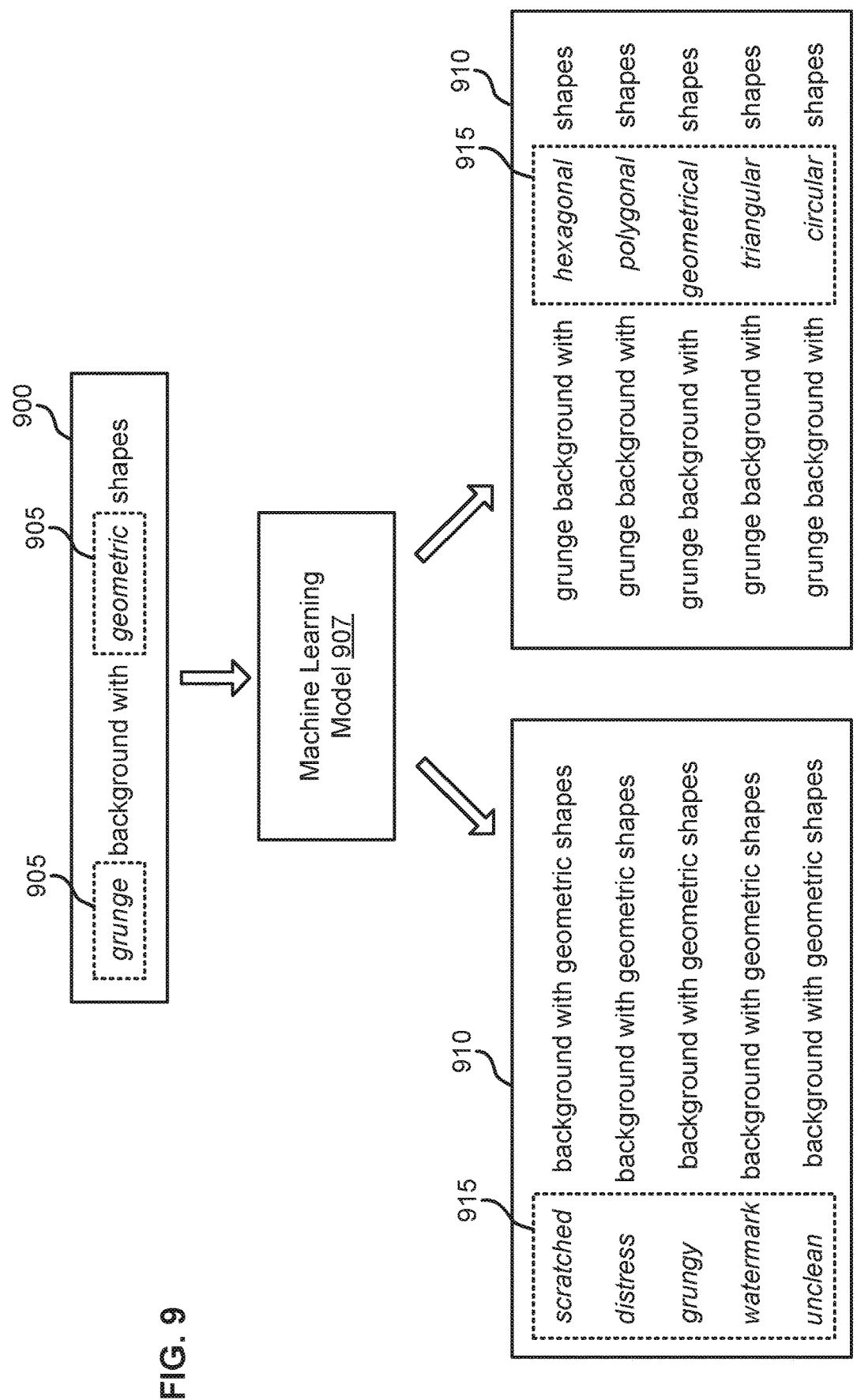
FIGS. 9 and 10 show examples of generating alternative queries according to aspects of the present disclosure.

FIG. 9 shows an example of alternative queries according to aspects of the present disclosure. The example shown includes original query 900, target phrase 905, machine learning model 907, alternative query 910, and alternative phrase 915.

As illustrated in FIG. 9, original query 900 is "grunge background with geometric shapes". Target phrase 905 is "grunge" or "geometric". Original query 900 is an example of, or includes aspects of, the corresponding element described with reference to FIGS. 6, 7, and 10. Target phrase 905 is an example of, or includes aspects of, the corresponding element described with reference to FIGS. 6, 7, and 10.

According to an embodiment, machine learning model 907 generates one or more alternative queries based on the target phrase to be replaced. The alternative queries include an alternative phrase in place of the target phrase that is consistent with a context of the target phrase. For example, target phrase 905 is "grunge" of original query 900. The generated alternative queries are "scratched background with geometric shapes", "distress background with geometric shapes", "grungy background with geometric shapes", "watermark background with geometric shapes", and "unclean background with geometric shapes". Machine learning model 907 is an example of, or includes aspects of, the corresponding element described with reference to FIGS. 2 and 10. Alternative query 910 is an example of, or includes aspects of, the corresponding element described with reference to FIG. 10.

In the above example, alternative phrases 915 are "scratched", "distress", "grungy", "watermark", and "unclean", respectively. Alternative phrase 915 is an example of, or includes aspects of, the corresponding element described with reference to FIG. 10.

In another example, target phrase 905 is "geometric" in original query 900. The generated alternative queries are "grunge background with hexagonal shapes", "grunge background with polygonal shapes", "grunge background with geometrical shapes", "grunge background with triangular shapes", and "grunge background with circular shapes". In this example, alternative phrases 915 are "hexagonal", "polygonal", "geometrical", "triangular", and "circular", respectively.

Figure 10:
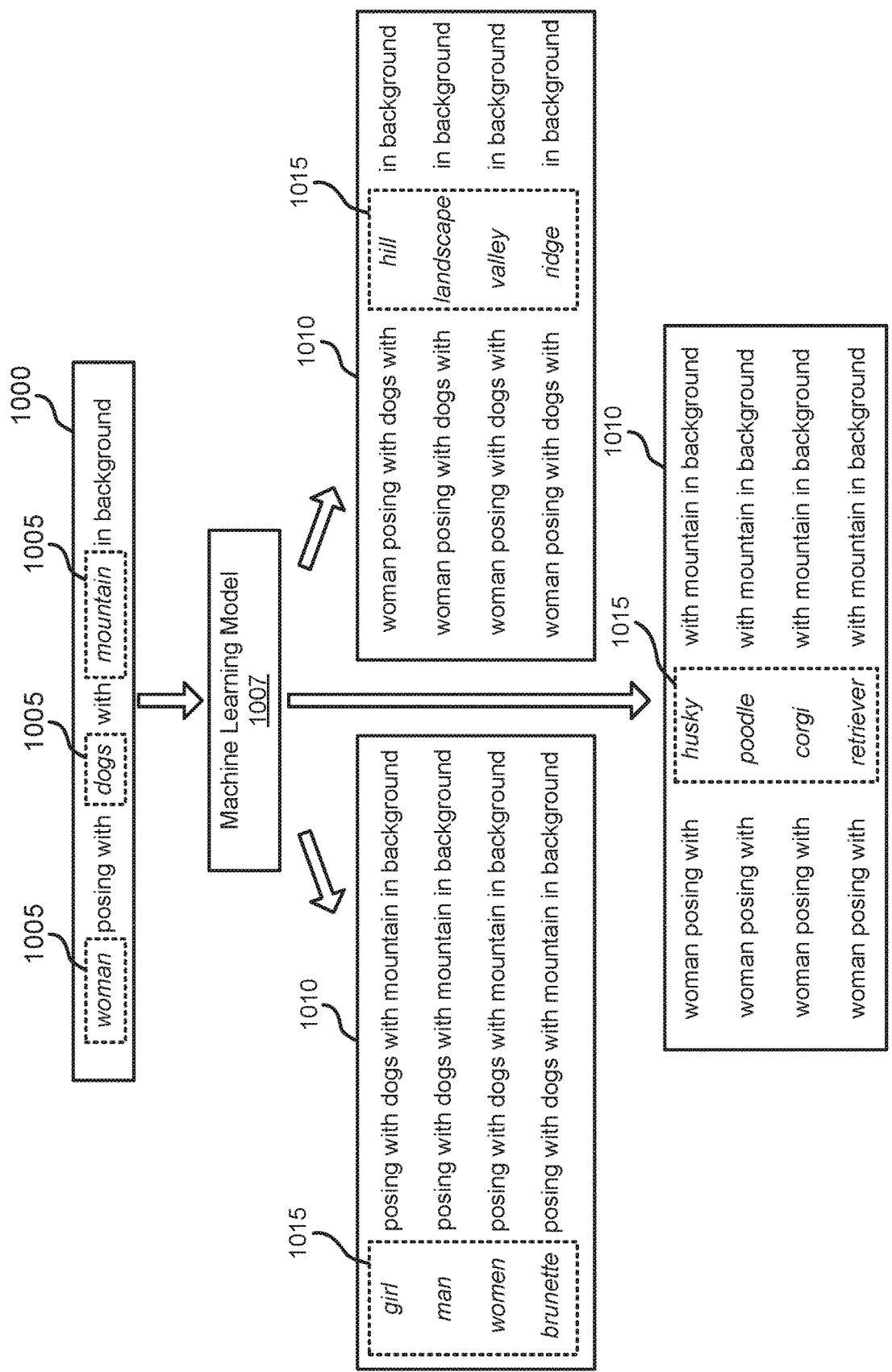

FIG. 10 shows an example of alternative queries according to aspects of the present disclosure. The example shown includes original query 1000, target phrase 1005, machine learning model 1007, alternative query 1010, and alternative phrase 1015.

As illustrated in FIG. 10, original query 1000 is "woman posing with dogs with mountain in background". Original query 1000 is an example of, or includes aspects of, the corresponding element described with reference to FIGS. 6, 7, and 9. Machine learning model 1007 generates one or more alternative queries based on the target phrase to be replaced. The alternative queries include an alternative phrase in place of the target phrase that is consistent with a context of the target phrase. For example, target phrase 1005 is "woman" of original query 1000. The generated alternative queries are "girl posing with dogs with mountain in background", "man posing with dogs with mountain in background", "women posing with dogs with mountain in background", and "brunette posing with dogs with mountain in background". Machine learning model 1007 is an example of, or includes aspects of, the corresponding element described with reference to FIGS. 2 and 9. Target phrase 1005 is an example of, or includes aspects of, the corresponding element described with reference to FIGS. 6, 7, and 9. Alternative query 1010 is an example of, or includes aspects of, the corresponding element described with reference to FIG. 9.

In the above example, alternative phrase 1015 is "girl", "man", "women", and "brunette", respectively. Alternative phrase 1015 is an example of, or includes aspects of, the corresponding element described with reference to FIG. 9.

In another example, target phrase 1005 is "dogs" in original query 1000. The generated alternative queries 1010 are "woman posing with husky with mountain in background", "woman posing with poodle with mountain in background", "woman posing with corgi with mountain in background", and "woman posing with retriever with mountain in background". In this example, alternative phrase 1015 is "husky", "poodle", "corgi", and "retriever", respectively.

In another example, target phrase 1005 is "mountains" in original query 1000. The generated alternative queries 1010 are "woman posing with dogs with hill in background", "woman posing with dogs with landscape in background", "woman posing with dogs with valley in background", and "woman posing with dogs with ridge in background". In this example, alternative phrase 1015 is "hill", "landscape", "valley", and "ridge", respectively.

Figure 11:
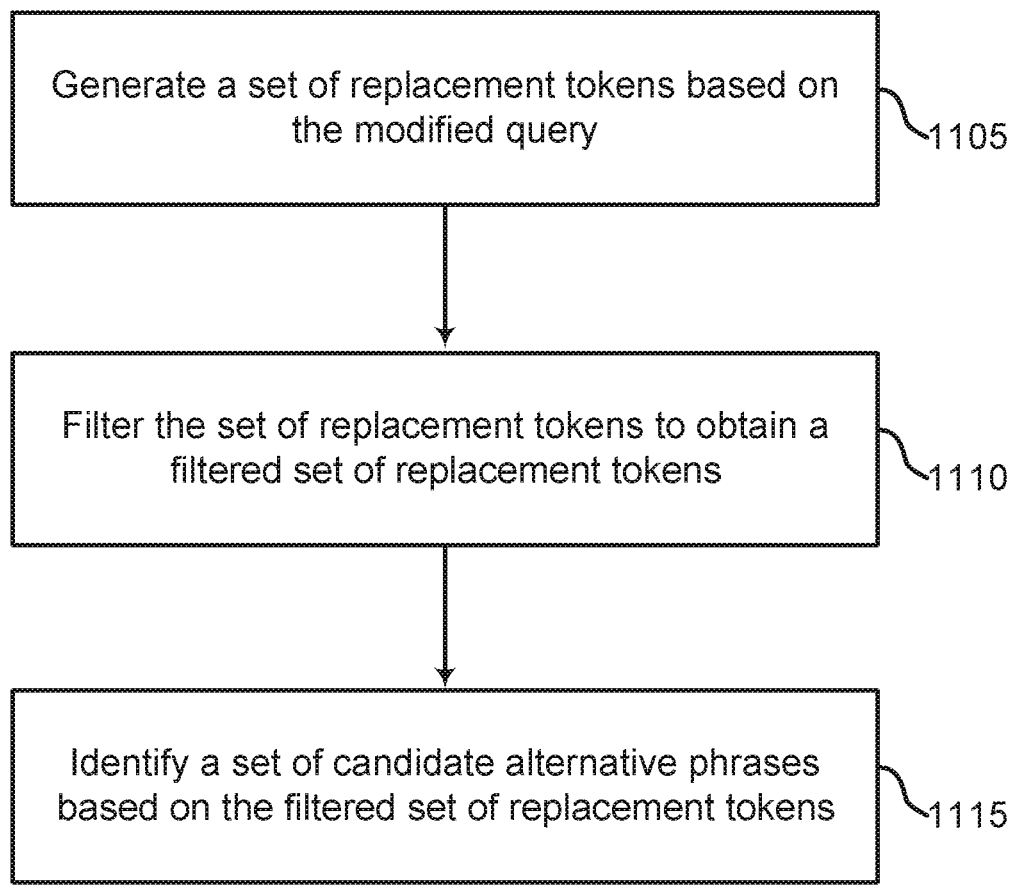
FIG. 11 shows an example of a method for identifying candidate alternative phrases according to aspects of the present disclosure.

FIG. 11 shows an example of a method for identifying candidate alternative phrases according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1105, the system generates a set of replacement tokens based on the modified query. In some cases, the operations of this step refer to, or may be performed by, a masked language model as described with reference to FIGS. 2-4. According to an embodiment, the masked language model and semantic word embeddings are used jointly for contextually and entity-aware nearest neighbors retrieval. The masked language model is a deep contextual language model including multi-headed attention. The masked language model can learn and identify linguistic structure without explicit supervision. The masked language model takes input tokens and generates output tokens. The modified query includes a tokenized query. The masked language model is trained with a fill in the mask or a fill in the blank objective.

At operation 1110, the system filters the set of replacement tokens to obtain a filtered set of replacement tokens. In some cases, the operations of this step refer to, or may be performed by, a filtering component as described with reference to FIG. 3. In some examples, a size of the filtered set of replacement tokens is smaller than a size of the set of replacement tokens.

At operation 1115, the system identifies a set of candidate alternative phrases based on the filtered set of replacement tokens. In some cases, the operations of this step refer to, or may be performed by, a machine learning model as described with reference to FIG. 2. According to an embodiment, a modified query (i.e., original query with a mask token or <mask> to be filled) is input to the masked language model. The masked language model attends over the non-mask tokens of the original query, which act as context and suggest words that can fill the mask token, i.e., <mask>. The suggested words are contextually aware and may also be referred to as candidate alternative phrases or their corresponding replacement tokens.

According to an embodiment, the last layer of the masked language model assigns logits scores to the tokens in a model vocabulary. The model vocabulary includes a predetermined list of words or phrases. Tokens are ranked according to the logits scores, and the top-rank tokens are selected to form the set of candidate alternative phrases. The rank number is configurable, e.g., top 5, 50, 500, 5000 or even more tokens.

Figure 12:
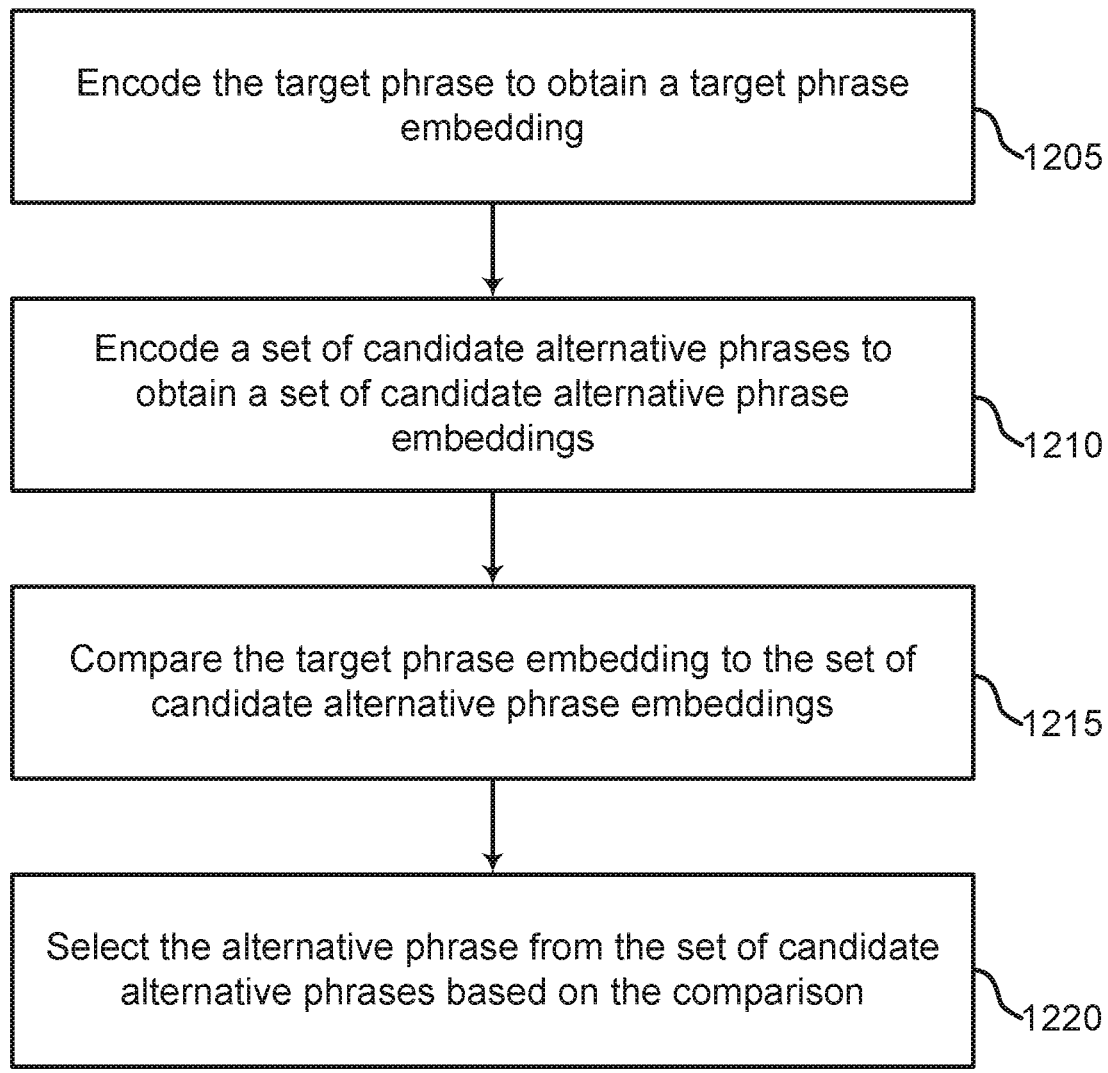
FIG. 12 shows an example of a method for selecting an alternative phrase according to aspects of the present disclosure.

FIG. 12 shows an example of a method for selecting an alternative phrase according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1205, the system encodes the target phrase to obtain a target phrase embedding. In some cases, the operations of this step refer to, or may be performed by, an embedding model as described with reference to FIGS. 2 and 3. According to an embodiment, the embedding model takes a token to replace (e.g., token-r) as input and generates token-r embedding. A token masking component inserts a mask token or <mask> in place of a target phrase of an original query to obtain a modified query.

At operation 1210, the system encodes a set of candidate alternative phrases to obtain a set of candidate alternative phrase embeddings. In some cases, the operations of this step refer to, or may be performed by, an embedding model as described with reference to FIGS. 2 and 3. The masked language model takes the modified query as input and generates a set of replacement tokens for <mask>, e.g., 5000 replacement tokens.

At operation 1215, the system compares the target phrase embedding to the set of candidate alternative phrase embeddings. In some cases, the operations of this step refer to, or may be performed by, a machine learning model as described with reference to FIG. 2. In some cases, the set of replacement tokens (i.e., nearest neighbor candidate set) may not be closely related to the token-r. The machine learning model filters out irrelevant tokens using semantic similarity (e.g., cosine similarity) with token-r.

At operation 1220, the system selects the alternative phrase from the set of candidate alternative phrases based on the comparison. In some cases, the operations of this step refer to, or may be performed by, a query generation component as described with reference to FIGS. 2 and 3.

Figure 13:
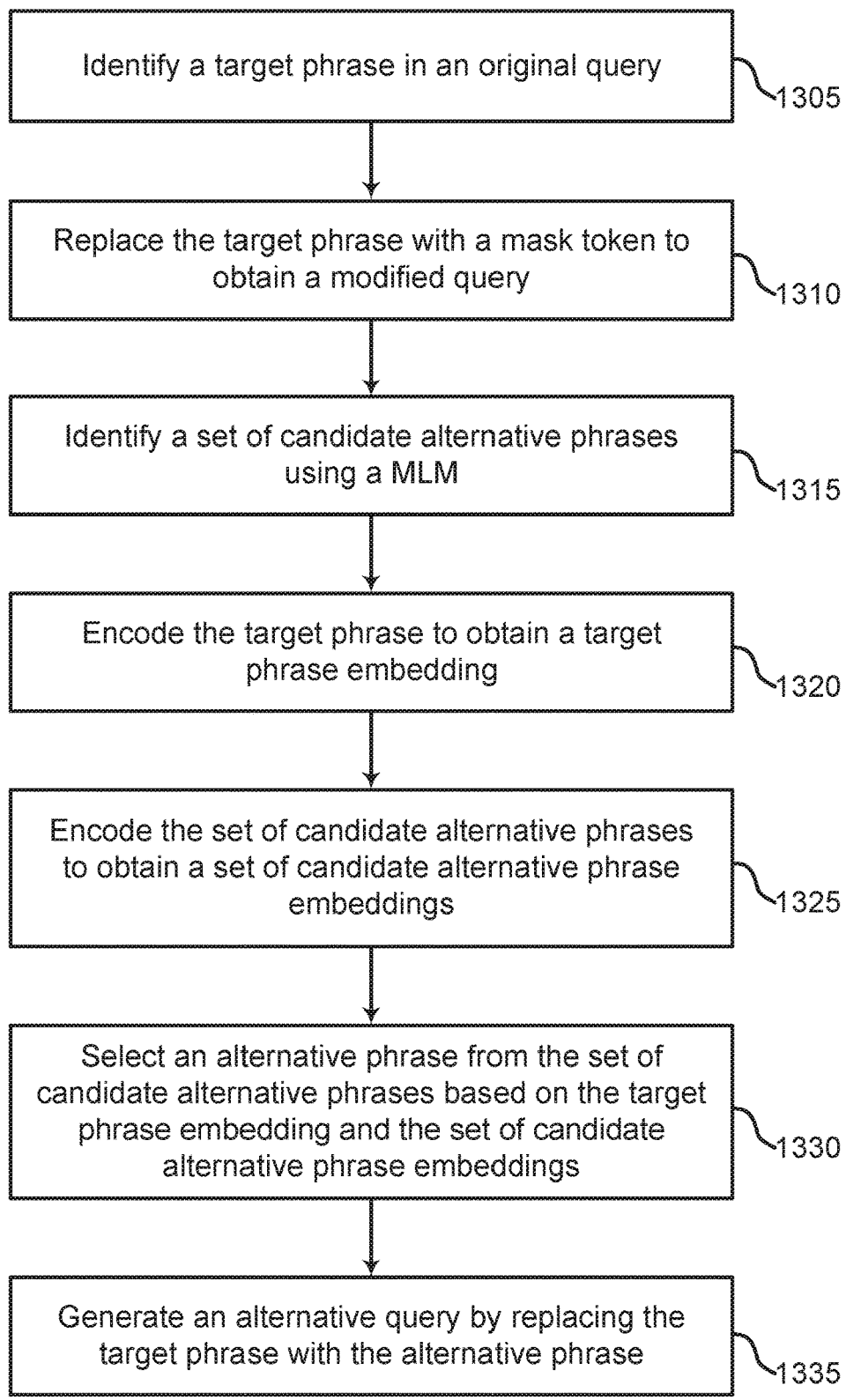
FIG. 13 shows an example of a method for query expansion according to aspects of the present disclosure.

FIG. 13 shows an example of a method for query expansion process according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1305, the system identifies a target phrase in an original query. In some cases, the operations of this step refer to, or may be performed by, a target phrase identification component as described with reference to FIG. 2. In some cases, the target phrase identification component selects a target phrase of the original query based on user selection. One or more phrases may be selected as target phrases. The target phrase is to be replaced with an alternative phrase.

At operation 1310, the system replaces the target phrase with a mask token to obtain a modified query. In some cases, the operations of this step refer to, or may be performed by, a token masking component as described with reference to FIGS. 2 and 3. According to an embodiment, the token masking component replaces the target phrase with a mask token or <mask> to obtain a modified query. The modified query is then input to MLM to generate an alternative query.

At operation 1315, the system identifies a set of candidate alternative phrases using an MLM. In some cases, the operations of this step refer to, or may be performed by, a masked language model as described with reference to FIGS. 2-4. According to some embodiments, the masked language model takes a modified query as input.

At operation 1320, the system encodes the target phrase to obtain a target phrase embedding. In some cases, the operations of this step refer to, or may be performed by, an embedding model as described with reference to FIGS. 2 and 3.

At operation 1325, the system encodes the set of candidate alternative phrases to obtain a set of candidate alternative phrase embeddings. In some cases, the operations of this step refer to, or may be performed by, an embedding model as described with reference to FIGS. 2 and 3.

At operation 1330, the system selects an alternative phrase from the set of candidate alternative phrases based on the target phrase embedding and the set of candidate alternative phrase embeddings. In some cases, the operations of this step refer to, or may be performed by, a query generation component as described with reference to FIGS. 2 and 3. In an embodiment, a ranking component compares the target phrase embedding to the set of candidate alternative phrase embeddings and ranks the set of candidate alternative phrases based on the comparison. The query generation component selects the alternative phrase from the set of candidate alternative phrases based on output from the ranking component. For example, the ranking component computes a similarity value (e.g., cosine similarity) between the target phrase embedding and each of the candidate alternative phrase embeddings.

At operation 1335, the system generates an alternative query by replacing the target phrase with the alternative phrase. The alternative phrase is consistent with a context of the target phrase. In some cases, the operations of this step refer to, or may be performed by, a query generation component as described with reference to FIGS. 2 and 3.

Performance of apparatus, systems and methods of the present disclosure have been evaluated, and results indicate embodiments of the present disclosure have obtained increased performance over existing technology. Example experiments demonstrate that query processing apparatus 200 outperforms conventional systems.

In some example experiments, MLM and the embedding model are trained on Adobe® Stock captions. 70 million Adobe® Stock captions are used for training. For word embeddings, a fastText model is trained with embeddings dimension of 300, learning rate of 0.05 and for 5 epochs. According to some embodiments, the masked language model includes a RoBERTa Base model. RoBERTa Base model is configured to have 258 max position embeddings, 12 attention heads, 12 hidden layers and 768 dimensions. However, embodiments of the present disclosure are not limited to RoBERTa model. The position embeddings are adjusted because caption sentences are shorter. RoBERTa model is trained from scratch over three epochs at 0.00001 learning rate with a linear learning rate schedule. A tokenizer for the masked language model is also trained based on byte-pair encoding (BPE) tokenization with 120k vocabulary size.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
identifying a target phrase in an original query, wherein the target phrase comprises a phrase to be replaced in the original query;
replacing the target phrase with a mask token to obtain a modified query;
identifying a plurality of candidate alternative phrases based on the modified query;
selecting an alternative phrase from the plurality of candidate alternative phrases based on the target phrase;
generating an alternative query based on the modified query using a masked language model (MLM), wherein the alternative query includes the alternative phrase in place of the target phrase; and
retrieving a search result based on the alternative query.

2. The method of claim 1, further comprising:
receiving the original query from a user; and
receiving a user input indicating the target phrase, wherein the target phrase is identified based on the user input.

3. The method of claim 1, further comprising:
tokenizing the original query to obtain a plurality of tokens; and
replacing a target token corresponding to the target phrase with the mask token to obtain the modified query, wherein the modified query comprises a tokenized query.

4. The method of claim 1, further comprising:
generating a plurality of replacement tokens based on the modified query;
filtering the plurality of replacement tokens to obtain a filtered set of replacement tokens; and
identifying the plurality of candidate alternative phrases based on the filtered set of replacement tokens.

5. The method of claim 1, further comprising:
encoding the target phrase to obtain a target phrase embedding;
encoding the plurality of candidate alternative phrases to obtain a plurality of candidate alternative phrase embeddings;
comparing the target phrase embedding to the plurality of candidate alternative phrase embeddings; and
selecting the alternative phrase from the plurality of candidate alternative phrases based on the comparison.

6. The method of claim 5, further comprising:
computing a similarity value between the target phrase embedding and each of the plurality of candidate alternative phrase embeddings, wherein the comparison is based on the similarity value.

7. The method of claim 1, further comprising:
generating an additional alternative phrase based on the modified query;
generating an additional alternative query that includes the additional alternative phrase in place of the target phrase; and
retrieving an additional search result based on the additional alternative query.

8. The method of claim 1, further comprising:
identifying an additional target phrase in the original query;
generating an additional alternative query based on the additional target phrase, wherein the additional alternative query includes an additional alternative phrase in place of the additional target phrase; and
retrieving an additional search result based on the additional alternative query.

9. The method of claim 1, further comprising:
encoding the alternative query to obtain an alternative query embedding;
comparing the alternative query embedding to one or more image embeddings; and
selecting the one or more image embeddings as the search result based on the comparison.

10. A method comprising:
identifying a target phrase in an original query;
replacing the target phrase with a mask token to obtain a modified query;
identifying, using a masked language model (MLM), a plurality of candidate alternative phrases based on the modified query;
encoding the target phrase to obtain a target phrase embedding;
encoding the plurality of candidate alternative phrases to obtain a plurality of candidate alternative phrase embeddings;

selecting an alternative phrase from the plurality of candidate alternative phrases based on the target phrase embedding and the plurality of candidate alternative phrase embeddings; and generating an alternative query by replacing the target phrase with the alternative phrase.

11. The method of claim 10, further comprising:
tokenizing the original query to obtain a plurality of tokens; and
replacing a target token corresponding to the target phrase with the mask token to obtain the modified query, wherein the modified query comprises a tokenized query.

12. The method of claim 10, further comprising:
generating a plurality of replacement tokens based on the modified query;
filtering the plurality of replacement tokens to obtain a filtered set of replacement tokens; and
identifying the plurality of candidate alternative phrases based on the filtered set of replacement tokens.

13. The method of claim 10, further comprising:
generating an image based on the alternative query.

14. The method of claim 10, further comprising:
encoding the alternative query to obtain an alternative query embedding;
comparing the alternative query embedding to one or more image embeddings; and
selecting the one or more image embeddings as a search result based on the comparison.

15. An apparatus comprising:
at least one processor;
at least one memory including instructions executable by the at least one processor;
a masked language model (MLM) comprising parameters stored in the at least one memory configured to generate a plurality of candidate alternative phrases based on a modified query, wherein the modified query comprises a mask token in place of a target phrase in an original query;
an embedding model comprising code stored in the at least one memory configured to encode the target phrase to obtain a target phrase embedding and to encode the plurality of candidate alternative phrases to obtain a plurality of candidate alternative phrase embeddings; and
a query generation component comprising code stored in the at least one memory configured to select an alternative phrase from the plurality of candidate alternative phrases based on the target phrase embedding and the plurality of candidate alternative phrase embeddings and to generate an alternative query by replacing the target phrase with the alternative phrase.

16. The apparatus of claim 15, further comprising:
a target phrase identification component comprising code stored in the at least one memory configured to identify the target phrase in the original query, wherein the target phrase comprises a phrase to be replaced in the original query.

17. The apparatus of claim 15, further comprising:
a tokenizer comprising code stored in the at least one memory configured to generate a token corresponding to each of a plurality of phrases in the original query.

18. The apparatus of claim 15, further comprising:
a token masking component comprising code stored in the at least one memory configured to replace the target phrase in the original query with the mask token to obtain the modified query.

19. The apparatus of claim 15, further comprising:
a search interface comprising code stored in the at least one memory configured to retrieve a search result based on the alternative query.

20. The apparatus of claim 15, wherein:
the MLM includes a transformer model comprising a plurality of attention heads and a plurality of hidden layers.

* * * * *